(12) United States Patent
Davis et al.

(10) Patent No.: US 7,878,756 B2
(45) Date of Patent: Feb. 1, 2011

(54) SYSTEMS AND METHODS FOR CONTROLLING SEAL CLEARANCE IN A TURBINE ENGINE

(75) Inventors: Todd Davis, Tolland, CT (US); Jennifer Reid, Sturbridge, MA (US)

(73) Assignee: United Technologies Corporation, Hartford, CT (US)

( * ) Notice: Subject to any disclaimer, the term of this patent is extended or adjusted under 35 U.S.C. 154(b) by 762 days.

(21) Appl. No.: 11/931,149

(22) Filed: Oct. 31, 2007

(65) Prior Publication Data
US 2009/0110545 A1 Apr. 30, 2009

(51) Int. Cl.
*F01D 25/16* (2006.01)
(52) U.S. Cl. .................... 415/1; 415/111; 415/133; 415/229; 415/171.1
(58) Field of Classification Search ............. 415/111, 415/132, 133, 170.1, 171.1, 229, 230
See application file for complete search history.

(56) References Cited

U.S. PATENT DOCUMENTS

| | | | |
|---|---|---|---|
| 3,385,624 A * | 5/1968 | Baclini ............. 292/341.18 |
| 4,035,044 A * | 7/1977 | Miyazaki ............... 384/447 |
| 4,222,708 A * | 9/1980 | Davison ................. 415/127 |
| 4,406,460 A | 9/1983 | Slayton | |
| 4,548,546 A * | 10/1985 | Lardellier ............... 415/133 |
| 4,709,545 A | 12/1987 | Stevens et al. | |
| 4,928,978 A | 5/1990 | Shaffer et al. | |
| 5,630,590 A | 5/1997 | Bouchard et al. | |
| 5,704,760 A | 1/1998 | Bouchard et al. | |
| 6,309,177 B1 * | 10/2001 | Swiderski et al. ...... 415/173.2 |
| 6,682,307 B1 | 1/2004 | Tiemann | |
| 7,001,145 B2 | 2/2006 | Couture et al. | |
| 7,510,374 B2 * | 3/2009 | Meacham ................ 415/229 |
| 2006/0140756 A1 | 6/2006 | Schwarz et al. | |
| 2007/0059158 A1 | 3/2007 | Alvanos et al. | |

* cited by examiner

*Primary Examiner*—Igor Kershteyn
(74) *Attorney, Agent, or Firm*—Carlson, Gaskey & Olds PC

(57) ABSTRACT

In one embodiment, a method for controlling seal clearance in a turbine engine includes positioning a seal ring within a turbine engine, the seal ring having an inner annular surface and an outer annular surface, the inner annular surface and the outer annular surface both being circular but non-concentric, rotating the seal ring within the engine until the seal ring is placed in an aligned orientation at which a center of a circle that defines the inner annular surface coincides with a centerline of the engine, and securing the seal ring while in the aligned orientation.

20 Claims, 6 Drawing Sheets

SYSTEMS AND METHODS FOR CONTROLLING SEAL CLEARANCE IN A TURBINE ENGINE

BACKGROUND

1. Field of the Invention

The present disclosure generally relates to turbine engines. More particularly, the present disclosure relates to systems and methods with which seal clearance within the engine can be adjusted to increase the effectiveness of the seals.

2. Description of the Related Art

Many turbine engines comprise a bearing compartment that contains various static and moving parts. Oil is used within the bearing compartment to lubricate those parts and reduce wear.

Typically, bearing compartments are sealed with a pressurized bearing compartment seal that is intended to inhibit leakage of oil from the bearing compartment. In some cases, the bearing compartment seal is positioned between the bearing compartment and a buffer air cavity into which relatively high-pressure air is pumped. By pumping relatively high-pressure air into the buffer air cavity, the cavity becomes pressurized, thereby creating a positive pressure differential between the buffer air cavity and the bearing compartment. The positive pressure differential promotes air leakage into the bearing compartment and therefore prevents or reduces oil leakage from the bearing compartment.

The aforementioned positive pressure differential between the buffer air cavity and the bearing compartment is often maintained with secondary seals that seal off the buffer air cavity from the remainder of the engine. Such secondary seals limit the escape of the relatively high-pressure air from the buffer air cavity, thereby maintaining relatively high pressure within the buffer air cavity.

Unfortunately, it can be difficult to maintain a positive pressure differential at low engine power settings. That difficulty is magnified in cases in which tolerance accumulation (i.e., the aggregate effect of the tolerances of the various individual engine parts) increases the clearance of portions of the secondary seals and therefore decreases their effectiveness. In particular, the increased clearance results in greater leakage of air from the buffer air cavity and, therefore, reduced pressure within the buffer air cavity, which may enable oil to escape the bearing compartment.

SUMMARY

In one embodiment, a method for controlling seal clearance in a turbine engine includes positioning a seal ring within a turbine engine, the seal ring having an inner annular surface and an outer annular surface, the inner annular surface and the outer annular surface both being circular but non-concentric, rotating the seal ring within the engine until the seal ring is placed in an aligned orientation at which a center of a circle that defines the inner annular surface coincides with a centerline of the engine, and securing the seal ring while in the aligned orientation.

BRIEF DESCRIPTION OF THE DRAWINGS

The disclosed systems and methods can be better understood with reference to the following drawings. The components in the drawings are not necessarily to scale.

DETAILED DESCRIPTION

As described in the foregoing, it can be difficult to maintain a positive pressure differential between a buffer air cavity and a bearing compartment due at least in part to tolerance accumulation that increases the clearance of secondary seals that seal off the buffer air cavity from the remainder of the engine and therefore provides a larger gap for air to escape from the cavity. As described in the following, however, secondary seal clearances can be controlled to counteract such tolerance accumulation and reduce the total area of the gap through adjustment of the positioning of the secondary seals during engine assembly.

Described in the following are systems and methods for controlling seal clearance. Although specific embodiments are presented, those embodiments are mere example implementations and it is noted that other embodiments are possible. All such embodiments are intended to fall within the scope of this disclosure.

Figure 1:
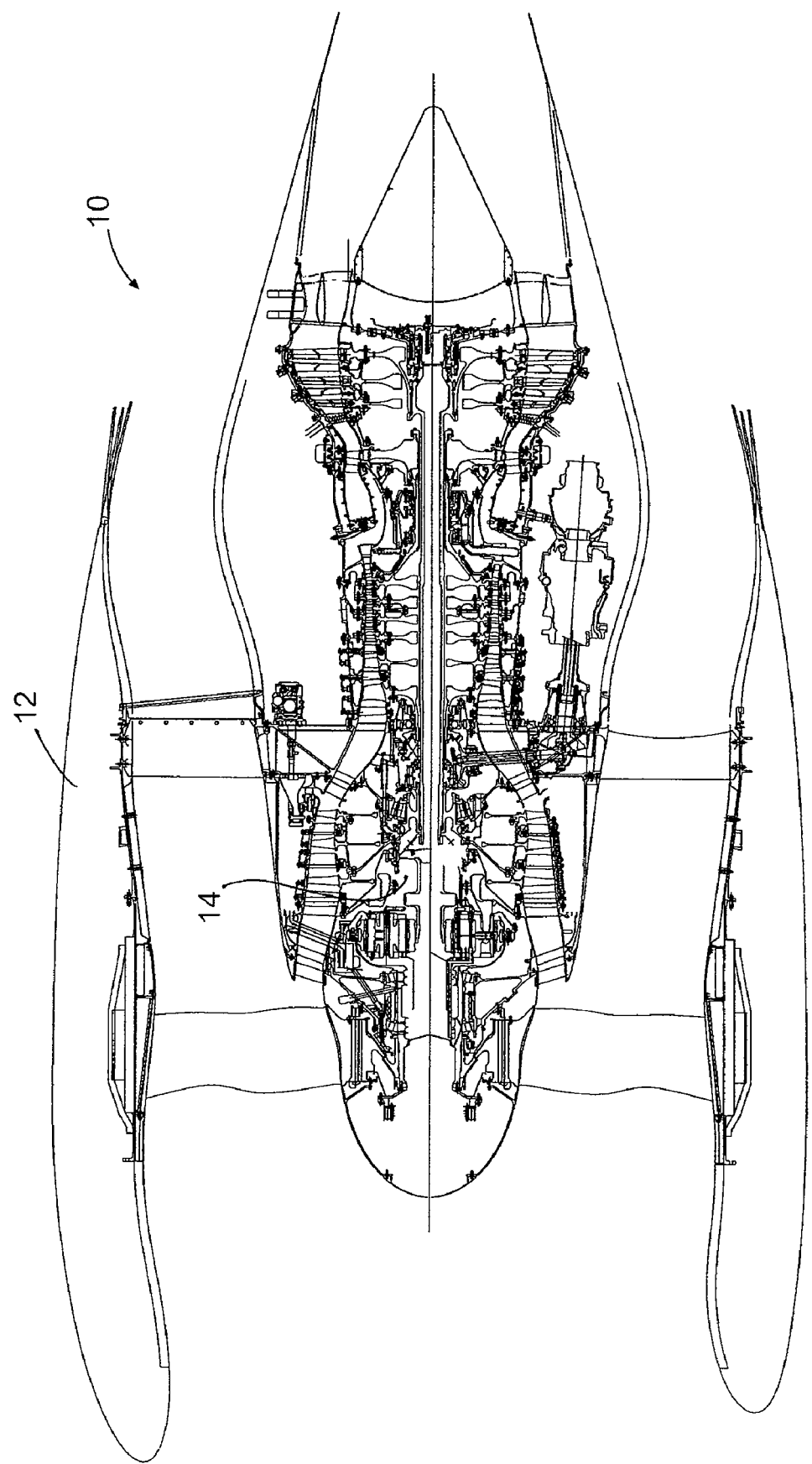
FIG. 1 is side view of an embodiment of a turbine engine in which the clearance of secondary seals can be adjusted during engine assembly.

Turning to the figures, in which like numerals identify corresponding components, FIG. 1 illustrates an embodiment of a turbine engine 10 that is mounted within an aircraft engine cowling 12. In the example embodiment of FIG. 1, the turbine engine 10 comprises a turbofan engine. It is to be appreciated, however, that the concepts described in the following can be applied to substantially any turbine engine that uses secondary seals to seal a buffer air cavity. As indicated in FIG. 1, the turbine engine 10 at least includes a bearing compartment 14, which contains oil that is to be maintained within the compartment. The bearing compartment 14 is more clearly illustrated in FIG. 2.

Figure 2:
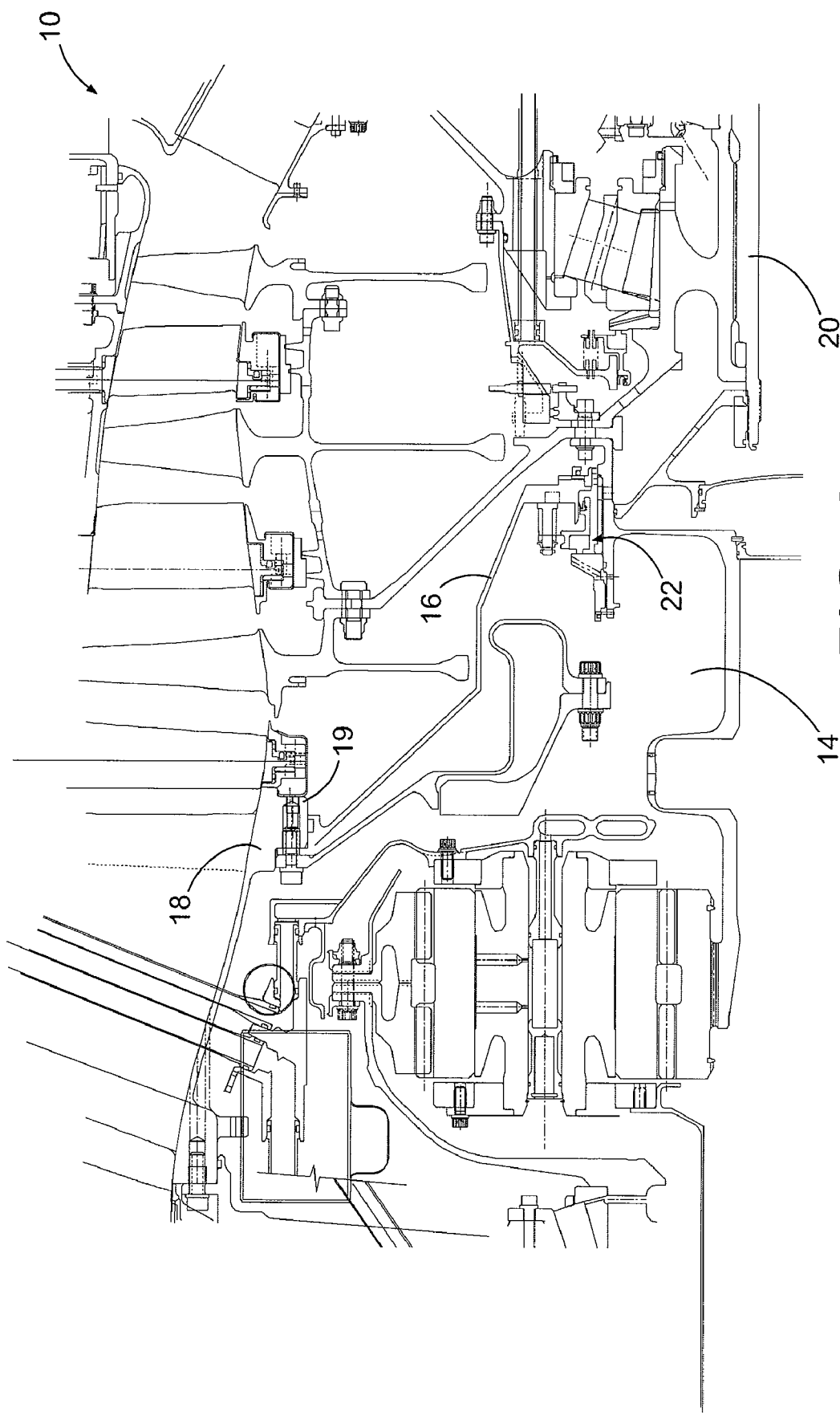
FIG. 2 is a first detail view of the turbine engine of FIG. 1, which more clearly illustrates a bearing compartment of the engine.

As indicated in FIG. 2, the bearing compartment 14 is defined in part by a stationary annular seal support 16 that extends from the engine casing 18 toward a rotatable turbine shaft 20 of the engine 10. The seal support 16 mounts to the casing 18 at various angularly spaced points with seal support mounting flanges 19 (only one such flange shown in FIG. 2). As described below, the positions of the mounting flanges 19 contribute to the positioning of secondary seals used to maintain a positive pressure differential relative to the bearing compartment 14. In addition to partly defining the bearing compartment 14, the seal support 16 further supports an annular bearing compartment seal assembly 22 that seals the bearing compartment and therefore limits leakage of oil from the compartment. The seal assembly 22 is more clearly illustrated in FIG. 3.

Figure 3:
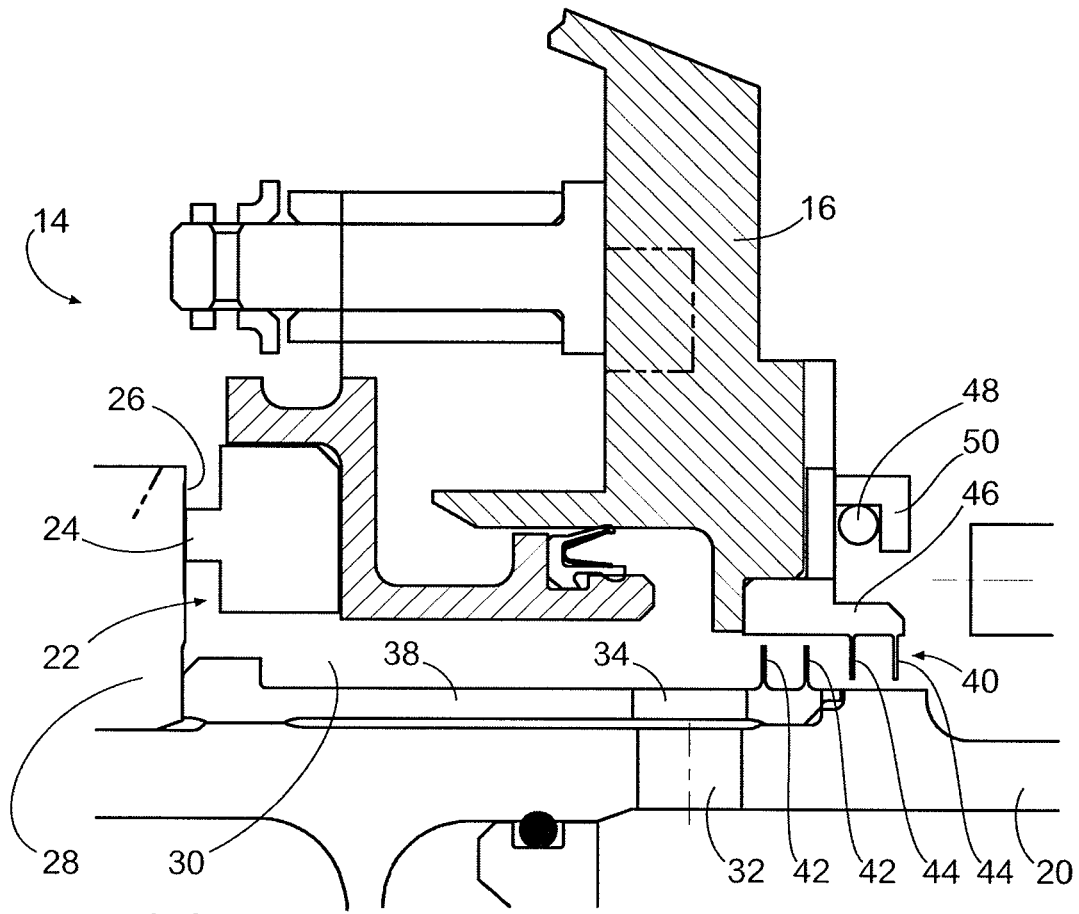
FIG. 3 is a second detail view of the turbine engine of FIG. 1, which more clearly illustrates a bearing compartment seal assembly of the engine.

As indicated in FIG. 3, the bearing compartment seal assembly 22 comprises an annular seal member 24 that contacts an annular seal land 26 that is provided on an annular seal seat 28 that is supported by the turbine shaft 20 (FIG. 2)

and therefore is configured to rotate relative to the seal member. In some embodiments, the seal member 24 is composed of carbon and the seal land 26 is composed of steel. As is apparent from FIG. 3, the seal member 24 separates the bearing compartment 14 from an adjacent buffer air cavity 30. The buffer air cavity 30 is pressurized by air that is pumped into the cavity via openings 32 and 34 that are respectively provided in the turbine shaft 20 and a seal spacer 38.

With further reference to FIG. 3, the buffer air cavity 30 is sealed by both the bearing compartment seal member 24 and secondary seals 40. In the embodiment of FIG. 3, the secondary seals 40 comprise annular knife edge seals. More particularly, a set of first knife edge seals 42 are provided on the turbine shaft 20 and a set of second knife edge seals 44 are provided on an annular seal ring 46, which is fixedly secured to the seal support 16. In some embodiments, the seal ring 46 is mounted to the seal support 16 with a snap ring 48 that is held in place by a retainer member 50. With the above configuration, the first knife edge seals 42 rotate with the turbine shaft 20 during engine operation while the second knife edge seals 44 remain stationary.

Figure 4:
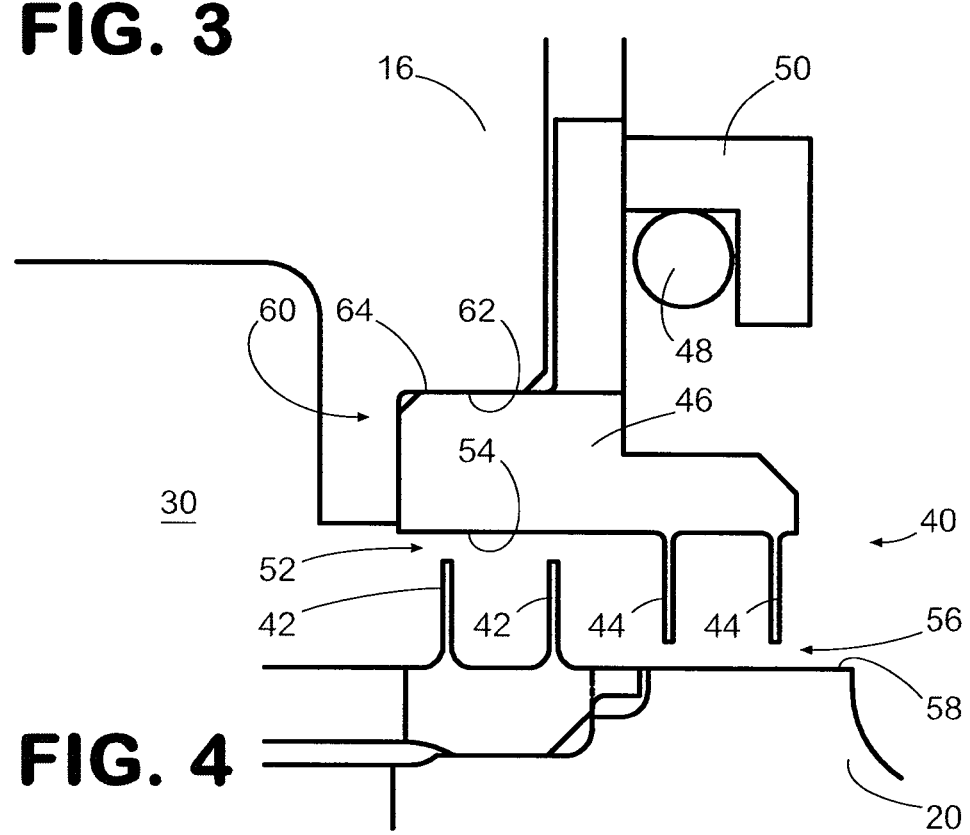
FIG. 4 is a third detail view of the turbine engine of FIG. 1, which more clearly illustrates a knife edge seals of the engine.

Referring next to FIG. 4, small gaps 52 exist between the knife edge seals 42 and a seal land 54 provided on the seal ring 46. In similar manner, small gaps 56 exist between the knife edge seals 44 and a seal land 58 provided on the turbine shaft 20. The gaps 52, 56 represent the clearance of the knife edge seals 42, 44 that is to be controlled to ensure proper pressurization of the buffer air cavity 30. Although it is desirable to minimize or at least reduce the clearance of the knife edge seals 42, 44, contact between the knife edge seals and their associated seal lands 54, 58 can result in the generation of debris that can adversely affect the engine 10 or its performance. Therefore, in at least some embodiments, a goal in engine design and assembly is to minimize/reduce the clearance of the knife edge seals 42, 44 through the entire circumference of the engine 10 while avoiding actual contact between the knife edge seals and their associated seal lands 54, 58.

Figure 5A:
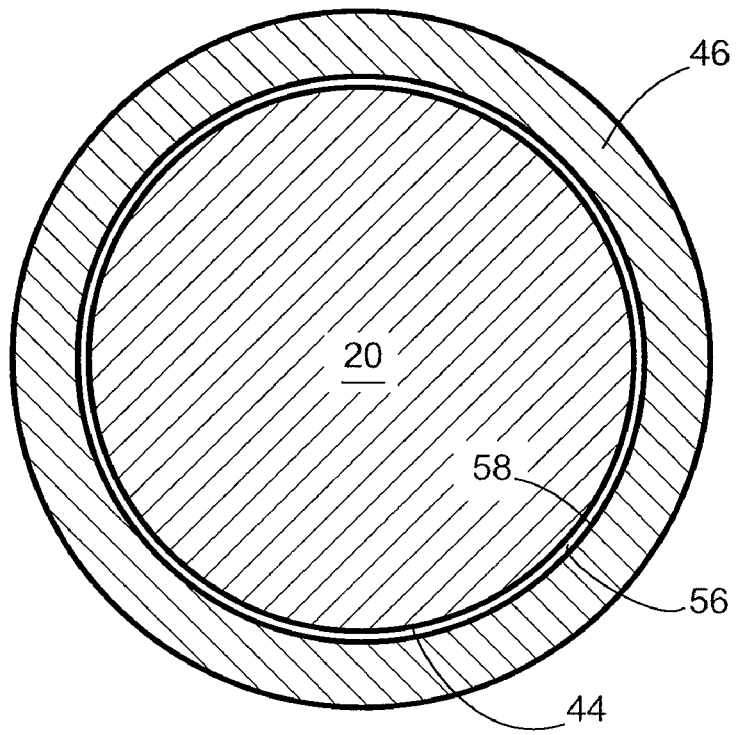
FIGS. 5A and 5B are schematic end views of a turbine shaft and a seal ring of the engine of FIG. 1

With further reference to FIG. 4, the seal ring 46 fits within an annular groove 60 provided in the seal support 16. The groove 60 is defined in part by an inner annular surface 62 that contacts or mates with an outer annular surface 64 of the seal ring 46. In some embodiments, both annular surfaces 62, 64 are circular and have similar diameters such that the relative angular orientations of the seal support 16 and the seal ring 46 can be adjusted, i.e., the seal ring can be rotated within and relative to the seal support. As described below, such adjustment facilitates adjustment of the relative positions of the seal ring 46 and the turbine shaft 20, which thereby adjusts the size of the gaps 52, 56. This phenomenon can be better understood with reference to the schematic drawings of FIGS. 5A and 5B. Shown in FIG. 5A is a schematic representation of the turbine shaft 20 as positioned within the seal ring 46. The gap 56 is visible (in exaggerated dimension) between the seal land 58 of the turbine shaft 20 and the edge of a second knife edge seal 44 of the seal ring 46. In FIG. 5A, the seal ring 46 is properly aligned with the turbine shaft 20. Specifically, the seal ring 46 is concentric with the turbine shaft 20. In such an arrangement, the gap 56 is uniform throughout the circumference of the engine 10 and therefore can be made smaller.

Figure 5B:
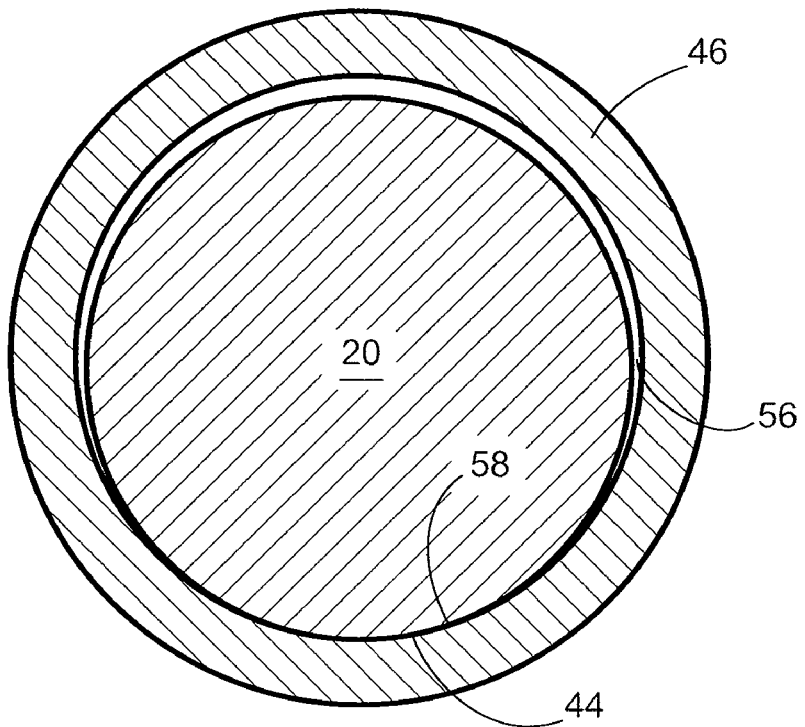

Turning to FIG. 5B, the seal ring 46 is offset relative to the turbine shaft 20, for example due to tolerance accumulation. Therefore, even though the seal ring 46 and the turbine shaft 20 have been designed and manufactured so as to take engine tolerances into account, the result is relatively large clearance at one portion of the gap 56, i.e., near the 12 o'clock position in the example of FIG. 5B, which may permit air to escape relatively easily from the buffer air cavity 30 (FIG. 4). In addition, the offset may result in undesired contact between the knife edge seals 44 and the seal land 58, as indicated at the 6 o'clock position in the example of FIG. 5B. From FIGS. 5A and 5B, it can be appreciated that the efficiency of the engine's knife edge seals can be maximized by locating the seal ring 46 circumferentially in a position at which the gaps 52 and 56 (FIG. 4) are smaller around the entire circumference of the engine 10.

Figure 6:
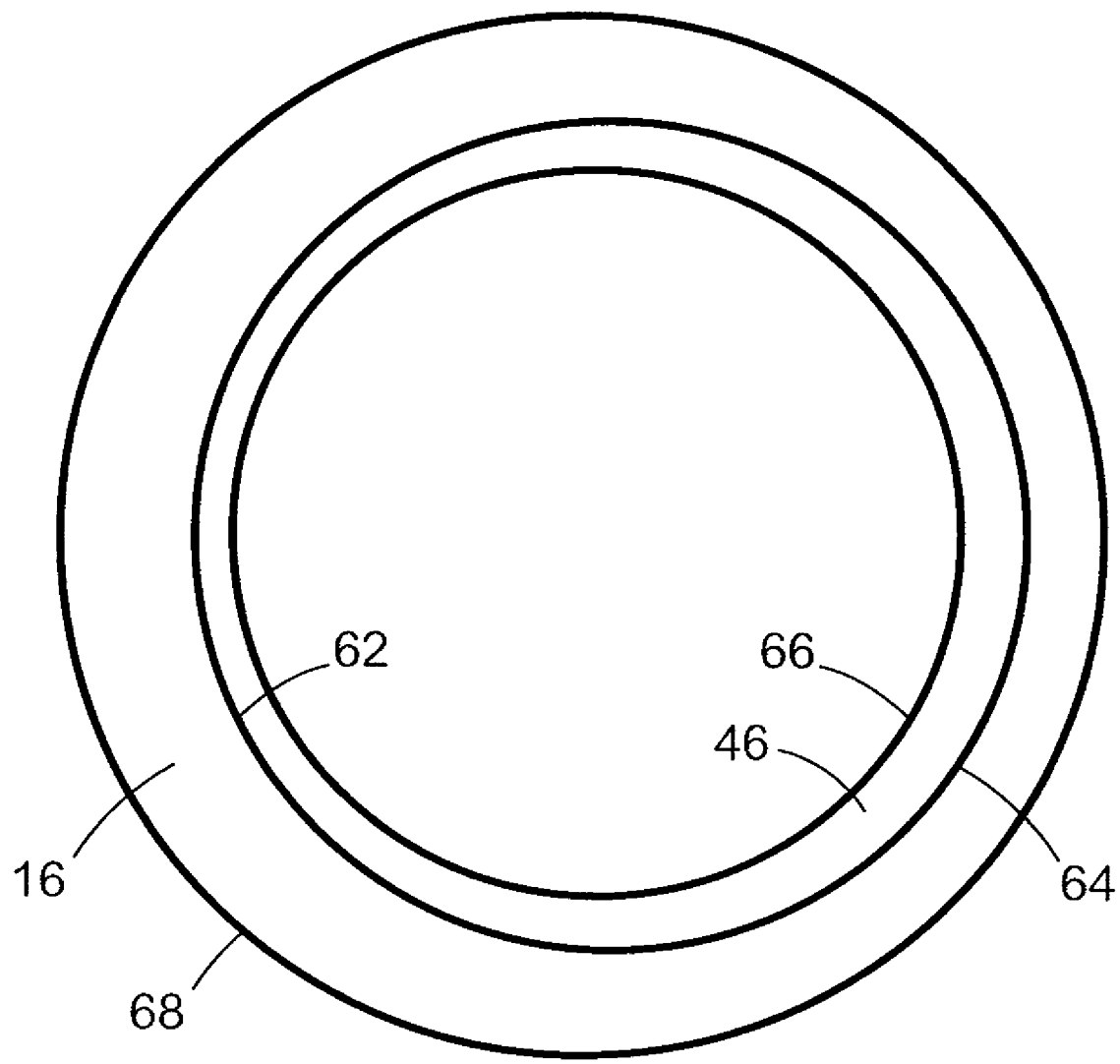
FIG. 6 is a schematic end view of a seal ring and a seal support of the engine of FIG. 1.

FIG. 6 schematically illustrates an end view of the seal ring 46 as positioned within the seal support 16. In FIG. 6, the inner periphery of the seal ring 46 is defined by an inner annular surface 66, which coincides with the edges of the second knife edge seals 44. The outer periphery of the seal ring 46 is defined by the outer annular surface 64 first identified in FIG. 4. As is apparent from FIG. 6, both the inner annular surface 66 (i.e., the edges of the second knife edge seals 44) and outer annular surface 64 of the seal ring 46 are circular. However, the two circles defined by the outer annular surface 64 and inner annular surface 66 are non-concentric. Specifically, the centers of those two circles are offset from each other such that the seal ring 46 has a larger radial dimension at some angular positions than at other angular positions. In the example orientation shown in FIG. 6, the seal ring 46 is largest at the 3 o'clock position and smallest at the 9 o'clock position.

With further reference to FIG. 6, the seal support 16 is defined by the inner annular surface 62 first identified in FIG. 4 and outer periphery 68. For purposes that will become clear in the following, the outer periphery 68 of the seal support 16 identifies the set of points at which the seal support 16 mounts to the engine casing, for example at the seal support mounting flanges 19 (FIG. 2). It is that set of points that affects the position of the inner annular surface 62, of the seal support 16 and, therefore, the position of the seal ring 46. As is apparent from FIG. 6, both the inner annular surface 62 and the outer periphery 68 are circular. However, the two circles defined by the inner annular surface 62 and the outer periphery 68 are non-concentric. Specifically, the centers of those two circles are offset from each other such that the seal support 16 has a radial dimension between its inner annular surface 62 and its outer periphery 68 that is greater at some angular positions than at other angular positions. In the example orientation shown in FIG. 6, that dimension is largest at the 9 o'clock position and smallest at the 3 o'clock position.

With the configuration described in relation to FIG. 6, the position of the seal ring 46 can be adjusted for minimum clearance. Such adjustment affects not only the position of the second knife edge seals 44 but also the position of the seal land 54 (FIG. 4). The positions of those elements, in turn, affect the uniformity of the gaps 52 and 56 (FIG. 4), and therefore the size of the gaps at discrete angular positions about the circumference of the engine 10. As mentioned above, such adjustment can be performed during engine assembly. That way, the effects of tolerance accumulation can be observed (e.g., measured) and counteracted before engine service. An example of such adjustment is described in relation to FIGS. 7A and 7B below.

Figure 7A:
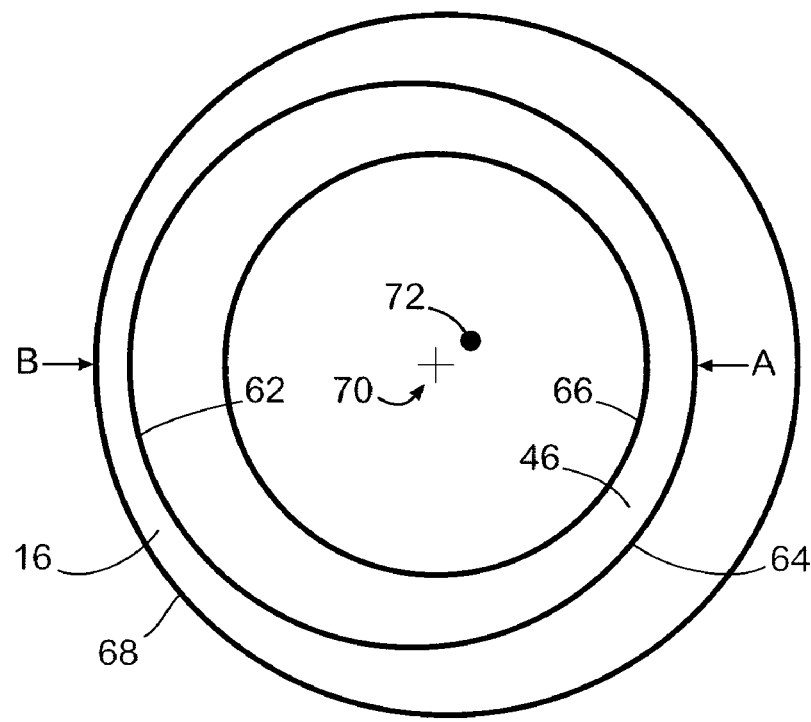
FIGS. 7A and 7B are schematic end views of a seal ring and a seal support of the engine of FIG. 1, which illustrate repositioning of the seal ring and seal support in order to reorient the seal ring and seal clearance.

Beginning with FIG. 7A, each of the seal ring 46 and the seal support 16 are shown in exaggerated scale to emphasize the non-concentric or eccentric nature of their inner annular surfaces 66 and 62, respectively. The center of the circle that defines the inner annular surface 66 of the seal ring 46, and therefore the edges of the second knife edge seals 44 (FIG. 4), is identified by crosshairs 70, while the centerline of the engine 10 (FIG. 1) is identified by point 72. In such a case, the center of the seal ring 46 is offset relative to the centerline of the engine 10, and therefore the centerline of the turbine shaft 20, for example due to tolerance accumulation. That offset represents a shift in the position of the second knife edge seals 44 and the seal land 54 that will decrease the uniformity of the gaps 52, 56 (FIG. 4), which affects the extent to which the size of the gaps can be reduced. To improve the uniformity of the gaps and enable reduction of the size of the gaps, it is desirable to adjust the position of the seal ring 46 such that the center 70 generally coincides with the engine centerline 72. Assuming the knife edge seals 42, 44 are dimensioned correctly, the gaps 52, 56 will be at a minimum at that point.

Figure 7B:
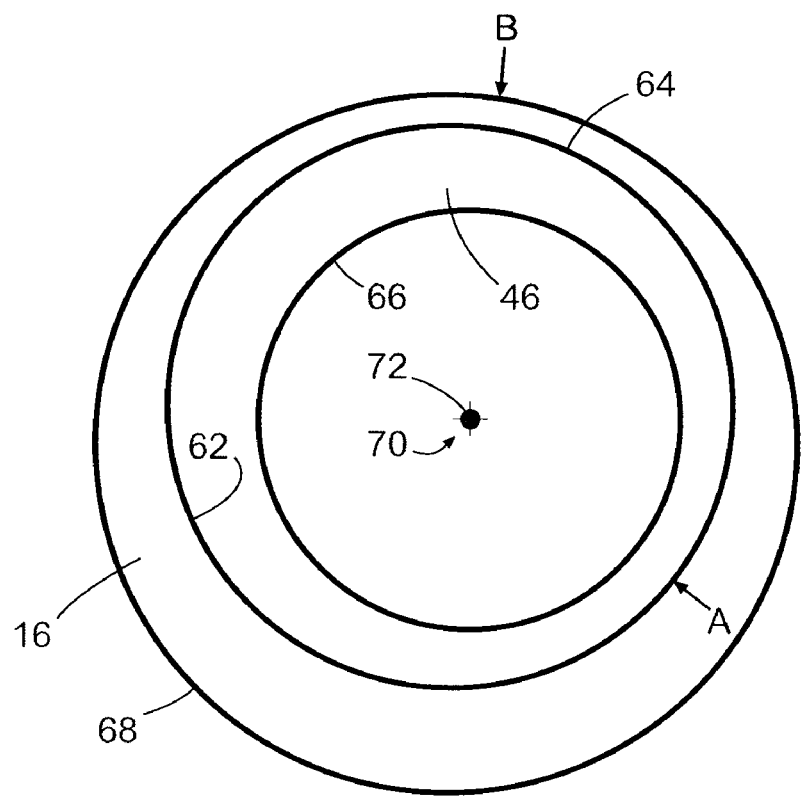

Due to the eccentricity of the seal ring 46 and the seal support 16, the position of the seal ring and its center 70 can be adjusted by adjusting the angular orientation of one or both of the seal ring and the seal support. In particular, one or both of the seal ring 46 and seal support 16 can be rotated to "dial in" the center 70 to a desired position, such as that of the engine centerline 72. FIGS. 7A and 7B illustrate such adjustment in the counter-clockwise direction. To aid the reader in identification of the angular movement of the seal ring 46 and the seal support 16, the minimum dimension of the seal ring has been identified by reference A and the minimum dimension of the seal support has been identified by reference B. In FIG. 7A, the minimum dimension A of the seal ring 46 is at the 3 o'clock position and the minimum dimension B of the seal support 16 is at the 9 o'clock position.

As mentioned above, the knife edge seal clearance can be made more uniform when the seal ring center 70 is moved toward the engine centerline 72. In FIG. 7A, the seal ring center 70 is positioned down and to the left of the engine centerline 72 in the orientation of the drawing. As indicated in FIG. 7B, the seal ring center 70 has been shifted up and to the right so as to coincide with the engine centerline 72. In the example of FIG. 7B, that shifting has been achieved by rotating the seal support 16 such that its minimum dimension B moved from the 9 o'clock position to approximately the 12 o'clock position. In practice, such rotation comprises rotating the seal support 16 within and relative to the engine casing 18 (FIG. 2). In addition to rotating the seal support 16 relative to the engine casing 18, the seal ring 46 has been rotated relative to the seal support such that, after rotation of both the seal ring and the seal support, the minimum dimension of the seal ring moved from the 3 o'clock position to approximately the 4 o'clock position.

As can be appreciated from the above example, the location of the center of the seal ring 46, and therefore the location of the second knife edge seals 44 and the seal land 54 (FIG. 4) can be adjusted by changing the angular orientation of the seal support 16 relative to the engine casing 18 and, additionally or in exception, changing the angular orientation of the seal ring relative to the seal support.

Once the desired orientations have been obtained, the seal ring 46 and the seal support 16 can be fixed in place to prevent subsequent movement, with the seal support mounting to the engine casing 18 and the seal ring mounting to the seal support. The number of positions at which the seal ring center 70 can be positioned is substantially infinite in cases in which angular orientation of the seal ring 46 and/or the seal support 16 is substantially infinitely adjustable. In cases in which the seal ring 46 and/or the seal support 16 can only be secured in predetermined angular orientations, for example due to the positions of mounting features (e.g., mounting flanges, lug slots) that are used to secure the seal ring and/or the seal support, adjustment of the seal ring center is finite and can be "indexed" or "clocked" by alternative alignment of the mounting features.

In some embodiments, the offset between the seal ring center and the engine centerline can be determined by a mechanic charged with engine assembly. In particular, the mechanic can use engine-specific tooling in concert with traditional inspection gauges to measure any offset between the seal ring and the engine centerline. The mechanic can then rotate the seal ring 46 within the seal support 16 and rotate the seal support inside engine casing 18 (in that order or reverse order) according to a specific indexing pattern with the intention of mitigating the accumulated tolerance. In some embodiments, an indexing pattern can comprise a series of indicator marks provided along the outside of seal ring 46 and the seal support 16. An appropriate algorithm can then aid the mechanic in aligning the marks in the proper orientation to mitigate the accumulated tolerance. Such an algorithm can combine the manufacturing tolerances of the seal support 16, engine casing 18, seal ring 46, as well as overall engine assembly.

Once the components have been repositioned in the orientation indicated by the algorithm, the mechanic can perform a confirmation of the adjustment to ensure that the indicated orientations were correct. Such confirmation can be performed, for example, by using a feeler gauge or similar device that measures the gaps between the knife edge seals and their associated seal lands to confirm that the gaps are of a desired uniformity and size around the circumference of the engine.

Although an algorithm can be used to at least partially automate the adjustment of the seal ring and the seal support, it will be appreciated that the adjustment could be performed manually, either with the aid of mathematics or without.

The following are claimed:

1. A method for controlling seal clearance in a turbine engine, the method comprising:
   positioning a seal ring within the engine, the seal ring having an inner annular surface and an outer annular surface, the inner annular surface and the outer annular surface both being circular but non-concentric;
   rotating the seal ring within the engine until the seal ring is placed in an aligned orientation at which a center of a circle that defines the inner annular surface coincides with a centerline of the engine; and
   securing the seal ring while in the aligned orientation.

2. The method of claim 1, wherein the inner annular surface is defined by an edge of at least one knife edge seal of the seal ring.

3. The method of claim 1, wherein positioning the seal ring comprises positioning the seal ring within an annular groove of a seal support such that the outer annular surface contacts an inner annular surface of the groove.

4. The method of claim 1, further comprising:
   positioning a seal support within the turbine engine, the seal support having an inner annular surface adapted to receive the seal ring and an outer periphery at which the seal support mounts to the engine, the inner annular surface and the outer periphery of the seal support both being circular but non-concentric;
   also rotating the seal support relative to the engine; and
   securing the seal support to the engine.

5. The method of claim 4, wherein the outer annular surface of the seal ring contacts the inner annular surface of the seal support when the seal ring is received by the seal support.

6. The method of claim 1, further comprising determining an offset between the seal ring and the engine centerline.

7. The method of claim 6, further comprising using an algorithm to determine proper orientation of the seal ring to counteract the determined offset.

8. A method for controlling seal clearance in a turbine engine, the method comprising:

- positioning a seal support within a casing of the turbine engine, the seal support having an inner annular surface adapted to receive a seal ring and an outer periphery at which the seal support mounts to the casing, the inner annular surface and the outer periphery both being circular but non-concentric such that the seal support has a relatively large radial dimension at a first angular position and a relatively small radial dimension at a second angular position;
- positioning a seal ring within the seal support, the seal ring having an inner annular surface and an outer annular surface, the inner annular surface and the outer annular surface of the seal ring both being circular but non-concentric such that the seal ring has a relatively large radial dimension at a first angular position and a relatively small radial dimension at a second angular position;
- rotating the seal support relative to the casing and rotating the seal ring relative to the seal support until the seal ring is placed in an aligned orientation at which a center of a circle that defines its inner annular surface coincides with a centerline of the turbine engine; and
- securing the seal support to the casing and securing the seal ring to the seal support while the seal support is in the aligned orientation.

9. The method of claim 8, wherein the inner annular surface of the seal ring is defined by edges of knife edge seals of the seal ring.

10. The method of claim 8, wherein positioning the seal ring comprises placing the outer annular surface of the seal ring in contact with the inner annular surface of the seal support.

11. A turbine engine comprising:

- a seal support adapted to mount to the engine, the seal support having an inner annular surface adapted to receive a seal ring and an outer periphery at which the seal support mounts to the casing, the inner annular surface and the outer periphery both being circular but non-concentric; and
- a seal ring adapted to mount to the seal support, the seal ring having an inner annular surface and an outer annular surface, the inner annular surface and the outer annular surface of the seal ring both being circular but non-concentric;
- wherein a center of a circle that defines the inner annular surface of the seal ring can be adjusted to coincide with a centerline of the turbine engine by rotating the seal support relative to the engine and rotating the seal ring relative to the seal support to counteract tolerance accumulation.

12. The engine of claim 11, wherein the seal ring comprises knife edge seals and wherein edges of the knife edge seals define the inner annular surface of the seal ring.

13. The engine of claim 11, wherein the seal ring comprises a seal land that adapted to oppose knife edge seals provided on an turbine shaft of the engine.

14. The engine of claim 11, wherein the seal ring mounts within an annular groove of the seal support and wherein outer annular surface of the seal ring contacts the inner annular surface of the seal support when the seal ring is positioned within the annular groove.

15. The engine of claim 11, wherein engine comprises mounting flanges provided on an engine casing to which the seal support mounts.

16. The engine of 11, further comprising mounting elements that secure the seal ring to the seal support.

17. The engine of claim 16, wherein the mounting elements include a snap ring and a retainer member.

18. A turbine engine comprising:

- an engine casing;
- a seal support adapted to mount to the engine casing, the seal support having an inner annular surface adapted to receive a seal ring and an outer periphery at which the seal support mounts to the casing, the inner annular surface and the outer periphery both being circular but non-concentric;
- a seal ring adapted to mount to the seal support, the seal ring having an outer annular surface that contacts the inner annular surface of the seal support when the seal ring is mounted to the seal support, the seal ring further comprising knife edge seals, wherein a first circle that defines the outer annular surface and a second circle that defines edges of the knife edge seals are non-concentric; and
- a turbine shaft having a seal land adapted opposite the knife edge seals of the seal ring such that the seal land and the knife edge seals are separated by a gap;
- wherein the seal support can be rotated relative to the engine casing and the seal ring can be rotated relative to the seal support to increase the uniformity of the gap between the turbine shaft seal land and the seal ring knife edge seals.

19. The engine of claim 18, wherein the turbine shaft also comprises knife edge seals and wherein the seal ring also comprises a seal land adapted to oppose the turbine shaft knife edge seals, and wherein uniformity of a gap between the turbine shaft knife edge seals and the seal ring seal land can be increased through rotation of the seal support and the seal ring.

20. The engine of claim 18, wherein the engine comprises a turbofan engine.

* * * * *